US009709975B2

(12) United States Patent
Sonoda et al.

(10) Patent No.: US 9,709,975 B2
(45) Date of Patent: Jul. 18, 2017

(54) CONTROL SYSTEM OF SERVO MOTORS IMPROVING PROCESSING PRECISION OF PLURALITY OF AXES (71) Applicant: FANUC CORPORATION, Yamanashi (JP)

(72) Inventors: Naoto Sonoda, Yamanashi (JP); Yukio Toyozawa, Yamanashi (JP); Yasusuke Iwashita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/807,963

(22) Filed: Jul. 24, 2015

(65) Prior Publication Data
US 2016/0033954 A1 Feb. 4, 2016

(30) Foreign Application Priority Data
Jul. 30, 2014 (JP) .................. 2014-155212

(51) Int. Cl.
G05B 19/19 (2006.01)
G05B 19/402 (2006.01)

(52) U.S. Cl.
CPC .......... *G05B 19/19* (2013.01); *G05B 19/402* (2013.01); *G05B 2219/50336* (2013.01)

(58) Field of Classification Search
CPC .......... G05B 19/19; G05B 2219/50616; G05B 19/416
(Continued)

(56) References Cited

U.S. PATENT DOCUMENTS 6,823,235 B2 * 11/2004 Toyozawa ............ G05B 19/186
                                                        318/632
6,919,701 B2 *  7/2005 Nagata ...................... B25J 9/163
                                                        318/568.12
(Continued)

FOREIGN PATENT DOCUMENTS

JP    2002041114 A    2/2002
JP    4043996 B2      2/2008
(Continued)

OTHER PUBLICATIONS

English Abstract for Japanese Publication No. 4043996 B2, published Feb. 6, 2008, 2 pgs.
(Continued)

*Primary Examiner* — Rina Duda
(74) *Attorney, Agent, or Firm* — Fredrikson & Byron, P.A.

(57) ABSTRACT

A control system of servo motors in a machine tool, comprising a host control device which generates position command values for processing a workpiece, servo control devices which drive servo motors to operate a tool for processing using the position command values, and position detectors which detect positions of the servo motors or a tool position and further a position error computing part computes position error between the position command values and detected positions of the servo motors, a reference angle generating part calculates a reference point on a closed figure and a reference angle which varies monotonously from a current processing point under the condition that any position inside of the closed figure which the position command value forms as the center, and learning control parts use the reference angle and the position error as the basis to perform angle synchronization type learning control to control the servo motors.

4 Claims, 6 Drawing Sheets

(58) Field of Classification Search
USPC .................................................. 318/560, 625
See application file for complete search history.

(56) References Cited

U.S. PATENT DOCUMENTS

| | | | |
|---|---|---|---|
| 7,183,739 B2* | 2/2007 | Iwashita | H02P 5/52 318/560 |
| 7,847,502 B2* | 12/2010 | Iwashita | G05B 19/404 318/567 |
| 8,305,016 B2* | 11/2012 | Okita | G05B 19/404 318/34 |
| 2007/0185609 A1 | 8/2007 | Endo et al. | |
| 2008/0120566 A1* | 5/2008 | Iwashita | G05B 19/4069 715/771 |
| 2012/0059506 A1* | 3/2012 | Okita | G05B 13/0265 700/173 |

FOREIGN PATENT DOCUMENTS

| | | |
|---|---|---|
| JP | 4980453 B2 | 7/2012 |
| JP | 2012240142 A | 12/2012 |
| KR | 101157326 B1 | 6/2012 |

OTHER PUBLICATIONS

English Abstract for Japanese Publication No. 4980453 B2, published Jul. 18, 2012, 2 pgs.
English Translation of Abstract for Japanese Publication No. 2012240142, published Dec. 10, 2012, 1 page.
English Translation of Japanese Publication No. 2002041114, published Feb. 8, 2002, 23 pages.
Translated Decision to Grant a Patent for Japanese Application No. 2014-155212, Date of Mailing: Feb. 9, 2016, 3 pages.
Untranslated Decision to Grant a Patent for Japanese Application No. 2014-155212, Date of Mailing: Feb. 9, 2016, 3 pages.
Translated Notification of Reasons for Refusal for Japanese Application No. 2014-155212, Date of Mailing: Nov. 17, 2015, 4 pages.
Untranslated Notification of Reasons for Refusal for Japanese Application No. 2014-155212, Date of Mailing: Nov. 17, 2015, 4 pages.
English Abstract for Korean Publication No. 101157326 B1, published Jun. 15, 2012, 1 pg.

* cited by examiner

CONTROL SYSTEM OF SERVO MOTORS IMPROVING PROCESSING PRECISION OF PLURALITY OF AXES

BACKGROUND OF THE INVENTION

1. Field of the Invention

The present invention relates to a control system of servo motors which controls a machine tool or other machine. The present invention particularly relates to a control system of servo motors wherein a plurality of axes which are driven by servo motors are coordinated to improve a processing precision when processing a closed curve or polygon.

2. Description of the Related Art

In general, in a drilling operation which uses a machining center or other machine tool, a boring operation which uses a dedicated tool is performed for improving the precision. The boring tool which is used in the boring operation has to be selected in accordance with the diameter of the hole being bored. Therefore, when boring holes of a plurality of different diameters, a plurality of boring tools become necessary.

Usually, in a machining center which is equipped with a numerical control device (CNC), an automatic tool changer (ATC) is provided. The ATC can be equipped with a plurality of tools, so the tools can be automatically changed in accordance with the operation. However, there is a limit to the number of tools which can be mounted at an ATC. For this reason, when an operation arises which is performed by a tool which is not stored at the ATC, time is required for changing the tool. There are therefore issues such as deterioration of the productivity.

As opposed to this, there is the method of replacing a boring operation which bores a hole with a milling operation. As one of the methods for the alternative operation of a milling operation, there is a helical machining operation. A helical machining operation is a machining operation using an end mill suitable for the diameter of the hole to be bored so as to repeat an arc motion in a helical manner so as to bore the hole. In a helical machining operation, in general, the arc motion is performed by the coordinated drive operation of a table which carries a workpiece by servo motors in the X-axis and the Y-axis directions.

When using a helical machining operation to bore a hole, even when boring a plurality of holes with different diameters, there is the advantage that a single end mill can handle the operation. On the other hand, a helical machining operation is accompanied with arc motion of the table, so if increasing the speed, due to the delayed response of the X-axis and Y-axis servo motors which drive the table or lost motion of the machinery (backlash or torsion), quadrant glitch (delay at time of reversal of drive axis) occurs and the precision is liable to deteriorate.

As a method for countering this deterioration of precision, the method of utilizing the fact that in a helical machining operation, the end mill repeats arc motion and of applying learning control to the control of the servo motors of the X-axis and Y-axis drive axes is the most effective. In particular, it is effective to apply angle synchronization type learning control enabling fluctuations of the processing speed to be handled as described in the servo motor drive control system which is disclosed in Japanese Patent No. 4043996, but in this case, angular information serving as the basis for the period of the learning control becomes necessary. The reference angle has to made to monotonously increase or monotonously decrease, but in the case of arc motion of an end mill by the two X-axis and Y-axis, there is no information (signal) which can be utilized as this reference angle.

To solve this problem, Japanese Patent No. 4980453B2 discloses a servo control system which cumulatively adds the X-axis or Y-axis command values or absolute values of the feedback values to thereby create information (signal) at the reference angle.

However, the servo control system which is disclosed in Japanese Patent No. 4980453 has the issue of being unable to handle the case where the diameter of the arc slowly changes. This issue arises since learning control requires the period of learning (for example 360 degrees etc.) as projected information in order to secure a memory corresponding to the period of repetition of the command value, but when preparing a signal corresponding to the reference angle from the command values or feedback values, the angle which the signal indicates is not the angle from the center, but the amounts of movement of the X-axis and Y-axis, so if the diameter of the circle changes, the amounts of movement change. As a result, in the servo control system which is disclosed in Japanese Patent No. 4980453, the period of the projected information and the actual amount of movement no longer match and correct learning control becomes no longer possible.

Figure 1A:
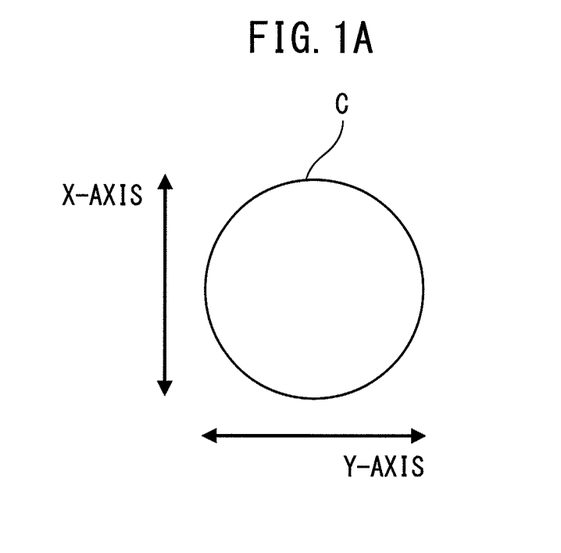
FIG. 1A is a view which illustrates a circular motion of an end mill in a helical machining operation.
Figure 1B:
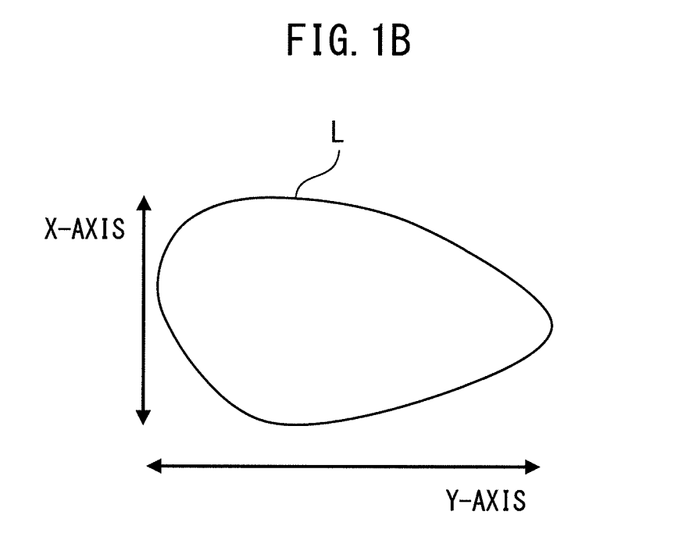
FIG. 1B is a view which illustrates a closed curve motion of an end mill in a helical machining operation.

For example, in a helical machining operation, when an end mill engages in circular motion such as illustrated in FIG. 1A, it is possible (easy) to calculate the amount of movement of the end mill corresponding to the learning period from the diameter of the circle "c". However, in a helical machining operation, when an end mill engages in motion such as the free closed curve L not a simple circle such as illustrated in FIG. 1B, it is not easy to calculate the amount of movement of the end mill.

SUMMARY OF INVENTION

In one aspect, an object of the present invention is to provide a control system of servo motors which enables angle synchronization type learning control to be applied and higher precision to be achieved even when performing a boring operation where a diameter of the hole gradually changes or even when processing a shape such as a free closed curve rather than a simple arc.

According to one aspect of the present invention, there is provided a control system of servo motors in a machine tool or an industrial machine which uses coordinated operations of a plurality of axes including two mutually orthogonal axes which are driven by servo motors so as to process a workpiece into the shape of a closed figure or a columnar member or conical member with that closed figure positioned in parallel at a top end and bottom end, comprising a host control device which generates a position command value for processing the workpiece, a servo control which which uses the position command value as the basis to drive the servo motors of the axes to operate a driven member which processes the workpiece, and position detectors which detect positions of the servo motors or a position of the driven member and further comprises a position error computing part which computes position error between the position command values and detected positions of the servo motors, a reference angle generating part which designates any position inside of a closed figure which the position command value forms as the center and calculates a reference angle which monotonously increases or monotonously decreases from a reference point on the closed figure and a current processing point, and learning control parts which use the reference angle and the position error as the basis to perform angle synchronization type learning control.

According to the control system of servo motors of the present invention, the system defines any point at the inside of a commanded closed curve or a polygon or other closed shape as the center, successively calculates an angle from a reference point to the current processing point, and uses this for angle synchronization type learning control, so in this case, if making the period 360 degrees, even if the diameter of the circle changes, learning control becomes possible. As a result, according to the control system of servo motors of the present invention, even when processing a shape such as a closed curve or a polygon, for which application was difficult in the past, angle synchronization type learning control can be applied and higher precision can be achieved.

BRIEF DESCRIPTION OF THE DRAWINGS

The present invention will be more clearly understood by reference to the figures attached below.

DETAILED DESCRIPTION

Below, the attached drawings will be used to explain the present invention in detail based on specific embodiments, but before explaining the embodiments of the present invention, FIG. 2A to FIG. 2F will be used to explain the processed shapes of workpieces of a control system of servo motors of the present invention.

Figure 2A:
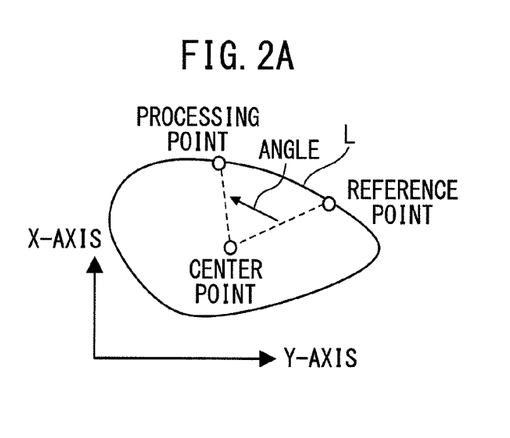
FIG. 2A is a closed curve which illustrates the shape of a workpiece to be processed by a machine tool which is provided with a control system of servo motors of the present invention.
Figure 2B:
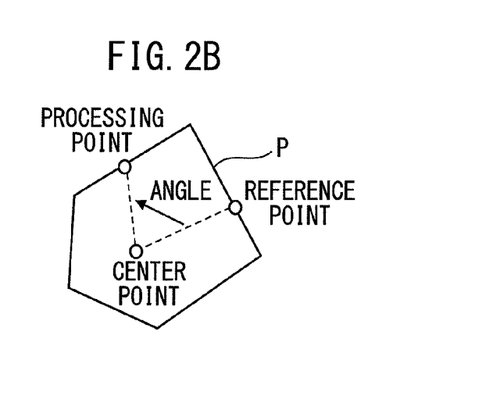
FIG. 2B is a polygon which illustrates the shape of a workpiece to be processed by a machine tool which is provided with a control system of servo motors of the present invention.
Figure 2C:
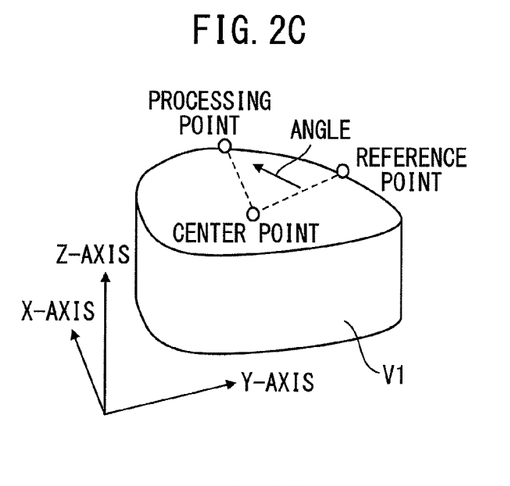
FIG. 2C is a columnar member which is provided at its top end and bottom end with surfaces which are surrounded by closed curves and illustrates the shape of a workpiece to be processed by a machine tool which is provided with a control system of servo motors of the present invention.
Figure 2D:
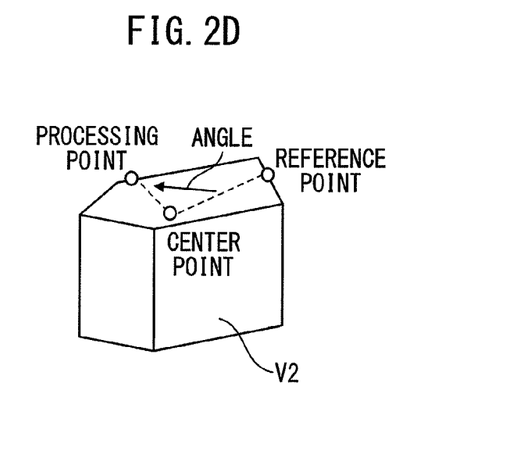
FIG. 2D is a polygonal column which illustrates the shape of a workpiece to be processed by a machine tool which is provided with a control system of servo motors of the present invention.
Figure 2E:
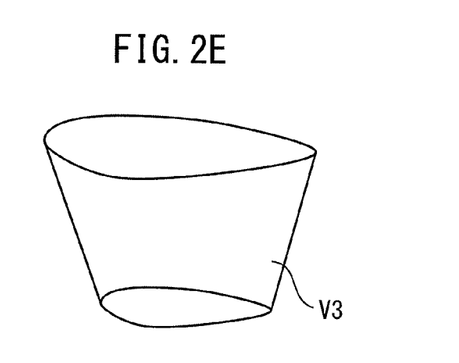
FIG. 2E is a conical member which is provided at its top end and bottom end with closed curves of similar shapes and illustrates the shape of a workpiece to be processed by a machine tool which is provided with a control system of servo motors of the present invention.
Figure 2F:
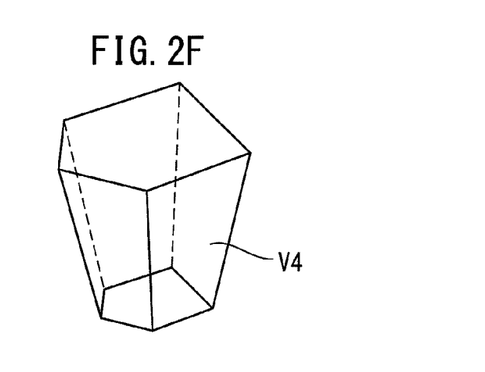
FIG. 2F illustrates a conical member which is provided at its top end and bottom end with polygons of similar shapes and illustrates the shape of a workpiece to be processed by a machine tool which is provided with a control system of servo motors of the present invention.
Figure 3:
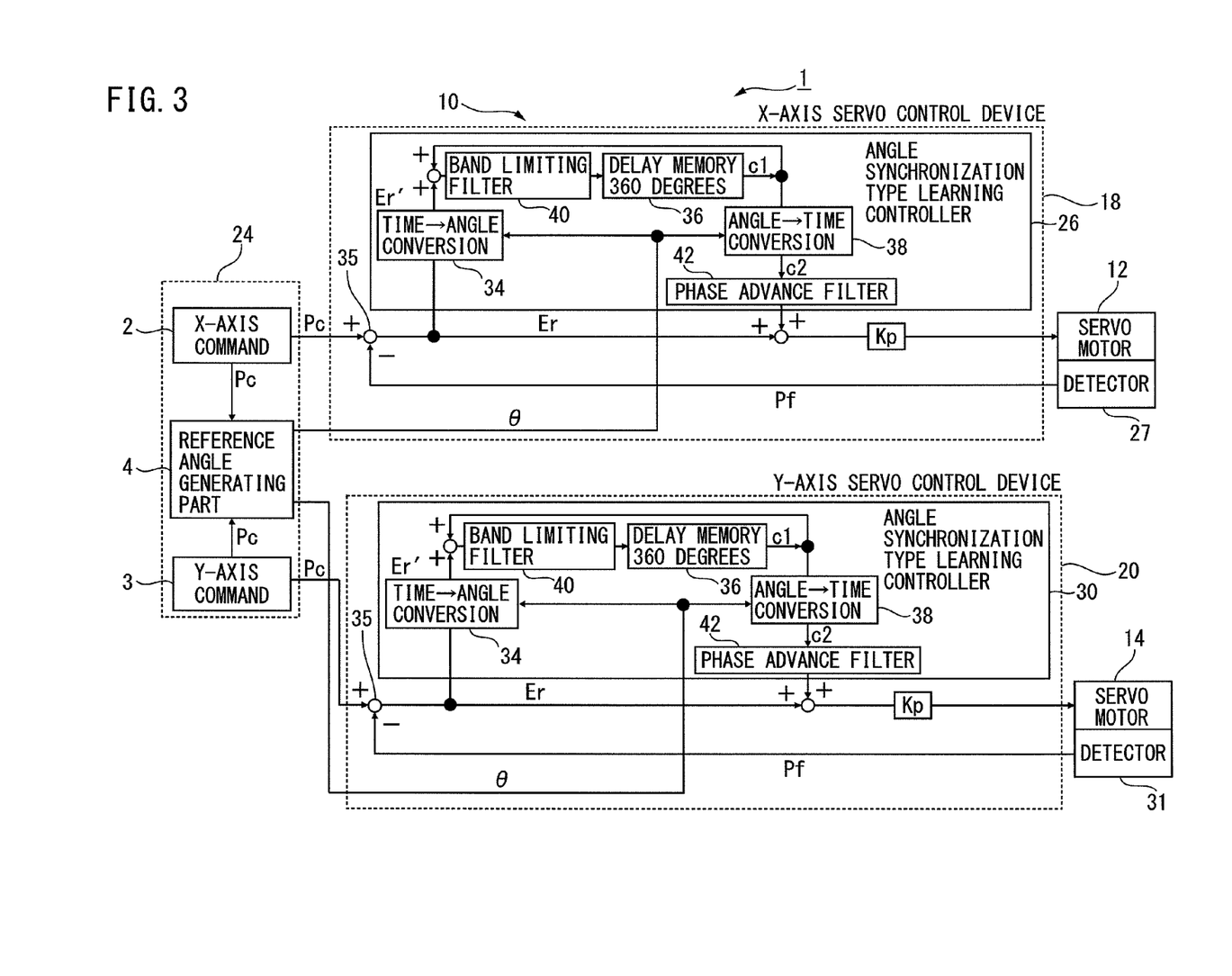
FIG. 3 is a block diagram of one embodiment of a control system of servo motors of the present invention.

The processed shapes of workpieces of the present invention include the following:

(a) A closed curve L such as illustrated in FIG. 2A on any plane where the curves (line segments) do not intersect (b) A polygon P such as illustrated in FIG. 2B (c) A columnar member V1 such as illustrated in FIG. 2C which has closed curves which include arcs which do not intersect at its top end and bottom end (d) A columnar member V2 such as illustrated in FIG. 2D which has polygonal surfaces at its top end and bottom end (e) A conical member V3 such as illustrated in FIG. 2E which is provided with closed curves of similar shapes at its top end and bottom end (f) A conical member V4 such as illustrated in FIG. 2F which is provided with polygons of similar shapes at its top end and bottom end Here, the basic configuration of one embodiment of the control system 1 of servo motors of the present invention will be explained using FIG. 3. The control system 1 of servo motors of the present invention comprises a host control device 24, servo control system 10, and position detectors 27 and 31. The control system 1 of servo motors is used in a machining center or other machine tool or industrial machine which includes at least two axes which perform coordinated operations such as a mutually orthogonal X-axis and Y-axis. In this case, the servo control system 10 is provided with an X-axis servo control device 18 and a Y-axis servo control device 20.

Further, in the control system 1 of a servo motor of the present invention, a Z-axis servo control device is not essential, so illustration is omitted. Note that when providing a Z-axis servo control device, its function may be similar to that of a conventional servo control device. That is, the Z-axis servo control device finds the error between a Z-axis position command value which is sent from the host control device for performing predetermined processing and a position feedback value of the Z-axis servo motor or a tool or other driven member which is driven by the Z-axis servo motor, adds gain to this error, and uses the result as a Z-axis servo speed command to control the Z-axis servo motor. The position feedback value is obtained by a position detector which detects the Z-position of the Z-axis servo motor or the driven member.

When the servo control system 10 is provided with the X-axis servo control device 18 and the Y-axis servo control device 20, the X-axis servo control device 18 and the Y-axis servo control device 20 use the different axes of position command values (X-axis command and Y-axis command) Pc which are sent from the numerical control device (NC) or other host control device 24 as the basis to prepare speed commands and use these speed commands to control the servo motors 12 and 14.

The X-axis servo control device 18 has an angle synchronization type learning controller 26. The learning controller 26 uses error Er of a periodic X-axis position command value Pc which is sent from the host control device 24 for performing predetermined processing and a position feedback value Pf of the X-axis servo motor 12 or a tool or other driven member (not illustrated) which is driven by the X-axis servo motor 12 as the basis to prepare a correction amount for control of the X-axis servo motor 12. The correction amount is added to the error Er, then amplified by the gain Kp and used as the X-axis servo speed command value for control of the X-axis servo motor 12. The position feedback value Pf is obtained by the position detector 27 which detects the position of the X-axis servo motor 12 or the driven member. Further, the X-axis servo control device 18 uses the reference angle θ which is sent from the host control device 24 as the basis for the learning controller 26 to perform learning control. Details of the learning control will be explained later.

Similarly, the Y-axis servo control device 20 has an angle synchronization type learning controller 30. The learning controller 30 uses error Er of the periodic Y-axis position command value Pc which is sent from the host control device 24 for performing predetermined processing and a position feedback value Pf of the Y-axis servo motor 14 or a driven member (not illustrated) which is driven by the Y-axis servo motor 14 as the basis to prepare a correction amount for control of the Y-axis servo motor 14. The correction amount is added to the error Er, then amplified by the gain Kp and used as the Y-axis servo speed command for control of the Y-axis servo motor 14. The position feedback value Pf is obtained by the position detector 31 which detects the Y-position of the Y-axis servo motor 14 or the driven member. Further, the Y-axis servo control device 20 uses the reference angle θ which is sent from the host control device 24 as the basis for the learning controller 30 to perform learning control. Details of the learning control will be explained later.

Here, a specific example of the configuration of the learning controller 26 in the X-axis servo control device 18 will be explained. In the X-axis servo control device 18, the position error Er is computed by an adder 35 from the position command value Pc which is sent from the host control device 24 and the position feedback value Pf which is sent from the position detector 27. The learning controller 26 acquires the position error Er of the X-axis servo motor 12 or the driven member as the first position error every predetermined sampling period (for example 1 ms). The first position error Er is sent to the first conversion part (FIG. 3 describes this as "TIME→ANGLE CONVERSION") 34 whereupon the first conversion part 34 converts the first position error Er to the second position error Er' for every reference angular position (explained later) of the driven member in one period. That is, the first position error Er (time) which is linked with the sampling period is converted to a second position error Er' (angle) which is linked with the reference angular position. This conversion technique itself is known, so the explanation will be omitted.

The second position error Er' is increased by the first correction amount of one period before in the periodic operation of the driven member which is stored in the delay memory 36 for normally 360 degrees, then is stored in the delay memory 36 as the first correction amount c1. The first correction amount c1 is sent to the second converting part (FIG. 3 describes this as "ANGLE→TIME CONVERSION") 38, then the second converting part 38 converts the first correction amount c1 for each reference angular position to the second correction amount c2 for each sampling period. That is, the first correction amount c1 (angle) which is linked with the reference angular position is converted to the second correction amount c2 (time) which is linked with the sampling period. This conversion technique itself is known, so its explanation will be omitted.

The learning controller 26 may be provided with a band limiting filter 40 which limits the band of the first correction amount c1 and a phase advance filter 42 which compensates for phase and compensates for gain of the second correction amount c2 from the second converting part 38, but these filters are not essential component elements. Note that the band limiting filter 40 specifically is a low pass filter for cutting off the signal in the high frequency region of a certain frequency region and has the effect of improving the stability of the control system. Further, the phase advance filter 42 is a filter which specifically makes the phase of the signal of the high frequency region in a certain frequency region advance and further raises the gain and has the effect of compensating for delays in the position control, speed control, current control and other control systems and for drops in gain. Note that the learning controller 30 of the Y-axis servo control device 20 can also be configured similar to the learning controller 26.

The host control device 24 includes an X-axis commanding part 2 and Y-axis commanding part 3 and a reference angle generating part 4. The X-axis commanding part 2 and the Y-axis commanding part 3 generate X-axis and Y-axis position command values Pc for each predetermined command distribution period T (for example T=1 ms). The reference angle generating part 4 receives as input the X-axis and Y-axis position command values Pc from the X-axis commanding part 2 and the Y-axis commanding part 3. Further, the reference angle generating part 4 uses the X-axis and Y-axis position command values Pc to generate the X-axis and Y-axis reference angles θ and inputs these to the X-axis learning controller 26 and the Y-axis learning controller 30.

Figure 4:
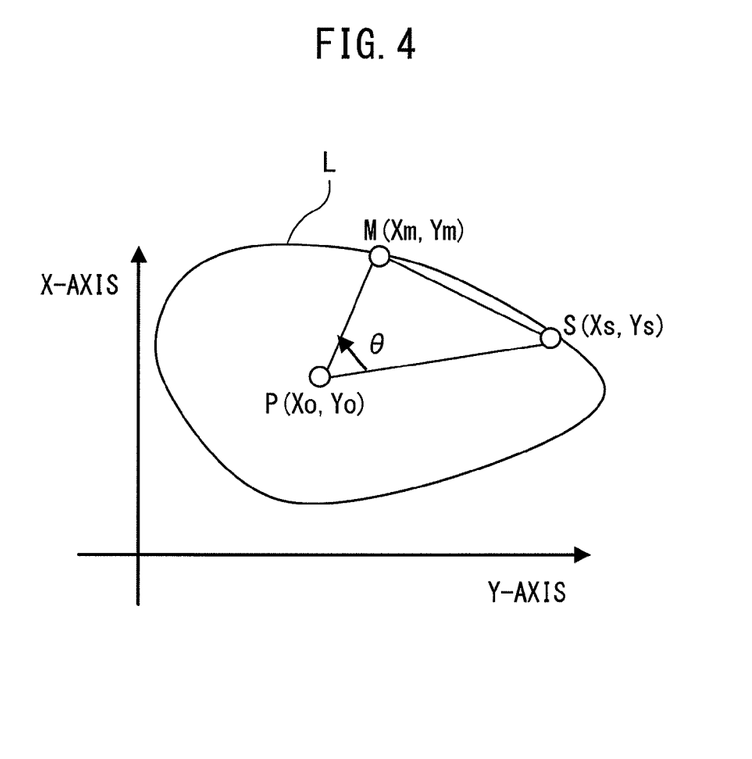
FIG. 4 is a view which illustrates a method of computing a reference angle in the case where the processed shape is a closed curve.

Here, the generation of the X-axis and Y-axis reference angles θ by the reference angle generating part 4 will be explained using FIG. 4. FIG. 4 is an example of the case where the position command value Pc, for example, forms a closed curve L. The reference angle generating part 4 defines any position inside of the closed curve L which the position command value Pc forms as the center and calculates a reference angle θ which monotonously increases or monotonously decreases from a reference point on the curve and the current processing point. For example, when repeatedly processing the closed curve L of the plane of the perpendicularly intersecting X- and Y-axes which are illustrated in FIG. 4, it defines any position P at the inside of the closed curve L as the center point and defines this coordinate as P(Xo, Yo). The driven member which performs the processing is repeatedly made to rotate in one direction along the closed curve L. The angle synchronization type learning control is performed at a predetermined sampling period, so the reference angles θ which are used here are also calculated for each same sampling period.

Here, the processing point on the closed curve one sampling period before the current processing point is designated by S(Xs, Ys), while the processing point at which processing is currently being performed is designated as M(Xm, Ym). Note that the reference point is made the processing start point (initial value) on the closed curve L. The above three points M, P, and S are used to find the reference angle θn at a certain time "n". The lengths PS, SM, and MP of the sides of the triangle which connects the three points are found by the following formula 1, formula 2, and formula 3 (where, √ means square root of everything in parentheses).

$$PS=\sqrt{((Xs-Xo)^2+(Ys-Yo)^2)} \qquad (1)$$

$$SM=\sqrt{((Xm-Xs)^2+(Ym-Ys)^2)} \qquad (2)$$

$$MP=\sqrt{((Xo-Xm)^2+(Yo-Ym)^2)} \qquad (3)$$

Further, the amount of change Δθ per sampling period of the reference angle θ found can be found from the law of cosines by the following formula 4.

$$\Delta\theta=\arccos(MP^2+PS^2-SM^2)/(2*MP*PS) \qquad (4)$$

Further, the reference angle θn which is found in the sampling period "n" is calculated as the cumulative value of the Δθ which is found by formula 4 from θn=Σ(Δθ). In processing by the driven member, the driven member constantly rotates in one direction and does not rotate in the opposite direction in the middle, so the found reference angle θ monotonously increases or monotonously decreases. The thus calculated reference angle θ, as explained above, is sent from the reference angle generating part 4 to the learning controller 26 of the X-axis servo control device 18 and the learning controller 30 of the Y-axis servo control device 20. By operation of the learning controllers 26 and 30, the servo motors 12 and 14 are controlled. Note that the center points, reference points, and processing points are also illustrated for the closed curve L which is illustrated in FIG. 2A, the polygon P which is illustrated in FIG. 2B, and the columnar members V1 and V2 which are illustrated in FIG. 2C and FIG. 2D.

Figure 5:
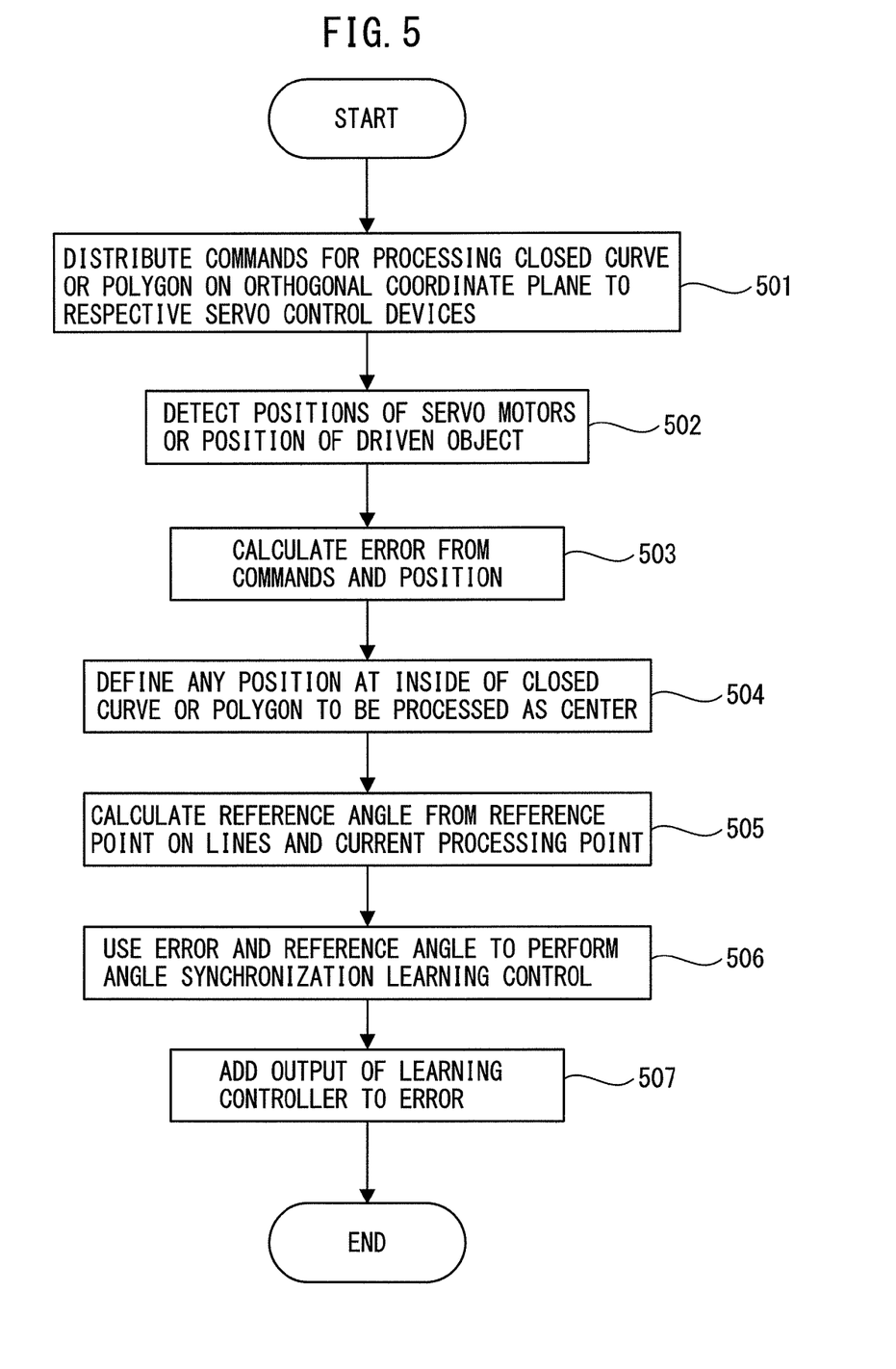
FIG. 5 is a flow chart which illustrates the operation of a control system of servo motors which is illustrated in FIG. 3.

Next, the flow of processing at the above explained control system 1 of servo motors will be explained using the flow chart which is illustrated in FIG. 5. Note that to facilitate understanding of the explanation, the reference notations of the component members in the control system 1 of servo motors which is illustrated in FIG. 3 will be assigned to explain the processing. At step 501, the host control device 24 distributes commands for processing a closed curve or polygon on perpendicularly intersecting coordinate planes (different axes of position command values Pc) to the X-axis servo control device 18 and the Y-axis servo control device 20 (below, referred to as the "servo control devices 18 and 20") every predetermined command distribution period T (for example, T=1 ms).

At the next step 502, the servo control devices 18 and 20 detect the positions of the servo motors 12 and 14 or the position of the driven member (position feedback value Pf). Next, at step 503, the servo control devices 18 and 20 calculate the error (position error Er) from the commands (position command values Pc) and position (position feedback value Pf). The error (position error Er) is input to the X-axis and Y-axis learning controllers 26 and 30.

On the other hand, the reference angle generating part 4 at the host control device 24 defines any position at the inside of a closed curve or a polygon which is processed at step 504 as the center (center point) and calculates and finds the reference angle θ from the reference point on the lines and the current processing point at step 505. It inputs the reference angle θ which is found to the X-axis and Y-axis learning controllers 26 and 30.

If the error (position error Er) and the reference angle θ are input to the X-axis and Y-axis learning controllers 26 and 30, at step 506, the X-axis and Y-axis learning controllers 26 and 30 use the error (position error Er) and reference angle θ to perform angle synchronization learning control. Angle synchronization learning control is known, so its explanation will be omitted.

If the X-axis and Y-axis learning controllers 26 and 30 perform angle synchronization learning control, the first correction amount c1 for each reference angle θ is converted to the second correction amount c2 for each sampling period and output from the X-axis and Y-axis learning controllers 26 and 30. At step 507, the servo control devices 18 and 20 add the outputs of the X-axis and Y-axis learning controllers 26 and 30 to the error (position error Er) to generate speed commands of the servo motors 12 and 14. The servo motors 12 and 14 are controlled in drive operations by the speed commands.

Figure 6:
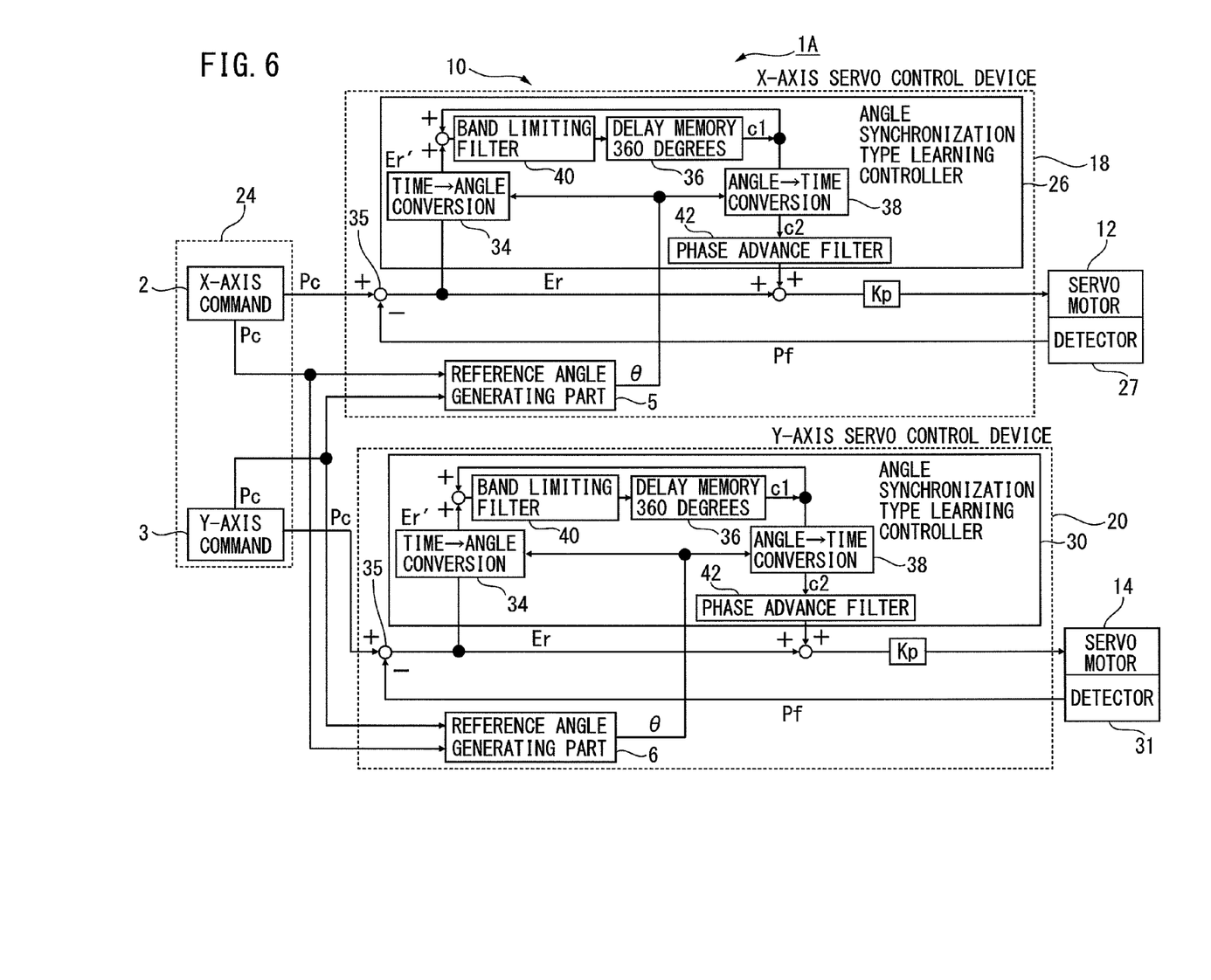
FIG. 6 is a block diagram of another embodiment of a control system of servo motors of the present invention.

Note that in the embodiment which was explained above, the reference angle generating part 4 was provided at the host control device 24, but the reference angle generating part 4, as illustrated in the other embodiment which is illustrated in FIG. 6, can also be provided as reference angle generating parts 5 and 6 at the X-axis servo control device 18 and the Y-axis servo control device 20. The control system 1A of servo motors of the embodiment which is illustrated in FIG. 6 is the same in configuration as the control system 1 of servo motors of the embodiment which is illustrated in FIG. 3 except for the reference angle generating parts 5 and 6, so the same component members are assigned the same reference notations and explanations are omitted.

In this way, according to the control system of servo motors of the present invention, the system defines any point at the inside of a commanded closed curve or a polygon or other closed shape as the center, successively calculates the angle from the reference point to the current processing point, and uses this for angle synchronization type learning control, so in this case, if making the period 360 degrees, even if the diameter of the circle changes, learning control becomes possible. As a result, according to the control system of servo motors of the present invention, angle synchronization type learning control can be applied and higher precision can be achieved even when processing a shape such as a closed curve or a polygon for which application was difficult in the past.

What is claimed is:

1. A control system of servo motors in a machine tool or an industrial machine which uses coordinated operations of a plurality of axes including two mutually orthogonal axes which are driven by servo motors so as to process a workpiece into the shape of a closed figure having a convex area existing in one quadrant defined by X-axis and Y-axis or a columnar member or conical member with that closed figure positioned in parallel at a top end and bottom end, comprising a host control device which generates position command values at every predetermined sampling period for processing said workpiece, a servo control system which uses said position command values as the basis to drive said servo motors of the axes to operate a driven member which processes said workpiece, and position detectors which detect positions of said servo motors or a position of said driven member and further comprising:

a position error computing part which computes position error between said position command values and detected positions of said servo motors, a reference angle generating part, and learning control parts said reference angle generating part performs as follows:

designates any position inside of a closed figure which said position command value forms as the center point P and defines this coordinate from the origin point (0,0) as P(Xo, Yo), designates a reference point S which is the processing point one sampling point before on said closed figure and defines this coordinate as S(Xs, Ys), designates a processing point M at which processing is currently being performed and defines this coordinate as M(Xm, Ym), calculates lengths PS, SM, and MP of sides of a triangle which connects the reference point S, the processing point M and the center point P by using the following formula 1, formula 2, and formula 3, $$PS = ((Xs-Xo)^2 + (Ys-Yo)^2)^{1/2} \quad (1)$$

$$SM = ((Xm-Xs)^2 + (Ym-Ys)^2)^{1/2} \quad (2)$$

$$MP = ((Xo-Xm)^2 + (Yo-Ym)^2)^{1/2} \quad (3)$$

calculates an amount of change $\Delta\theta$ per sampling period of the reference angle $\theta$ between two sides PS and MP by using the following formula 4, $$\Delta\theta = \arccos(MP^2 + PS^2 - SM^2)/(2*MP*PS) \quad (4) \text{ and}$$

calculates reference angle $\theta n$ which monotonously increases or monotonously decreases from a current processing point at a predetermined sampling period "n" as the cumulative value of the $\Delta\theta$, and said learning control parts perform angle synchronization type learning control based on said reference angle $\theta n$ and said position error.

2. The control system of servo motors according to claim 1, wherein said position error computing part and said learning control parts are provided at said servo control system.

3. The control system of servo motors according to claim 1, wherein said reference angle generating part is provided at said host control device.

4. The control system of servo motors according to claim 1, wherein reference angle generating parts are provided at said servo control device.

* * * * *